United States Patent
Seder et al.

(10) Patent No.: US 12,360,392 B2
(45) Date of Patent: Jul. 15, 2025

(54) SOCIAL UTILIZATION OF CAMPFIRE DISPLAY

(71) Applicant: GM Global Technology Operations LLC, Detroit, MI (US)

(72) Inventors: Thomas A. Seder, Fraser, MI (US); Joseph F. Szczerba, Grand Blanc, MI (US); John P. Weiss, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 442 days.

(21) Appl. No.: 18/153,783

(22) Filed: Jan. 12, 2023

(65) Prior Publication Data
US 2024/0241392 A1    Jul. 18, 2024

(51) Int. Cl.
*G02B 30/56* (2020.01)
*G06F 3/01* (2006.01)
*G06V 40/16* (2022.01)

(52) U.S. Cl.
CPC ........... *G02B 30/56* (2020.01); *G06F 3/012* (2013.01); *G06F 3/013* (2013.01); *G06F 3/017* (2013.01); *G06V 40/176* (2022.01)

(58) Field of Classification Search
CPC ........ G02B 30/56; G02B 30/40; B60K 35/00; G06F 3/012; G06F 3/107
See application file for complete search history.

(56) References Cited

U.S. PATENT DOCUMENTS

| | | | |
|---|---|---|---|
| 10,318,043 B2 | 6/2019 | Seder et al. | |
| 11,077,844 B2 | 8/2021 | Szczerba | |
| 2010/0046050 A1 | 2/2010 | Kroll et al. | |
| 2011/0002038 A1* | 1/2011 | Wang | H04N 13/388 359/479 |
| 2013/0100527 A1 | 4/2013 | Chung et al. | |
| 2013/0321776 A1 | 12/2013 | Loong et al. | |
| 2017/0322513 A1 | 11/2017 | Zapanta | |
| 2018/0147985 A1 | 5/2018 | Brown et al. | |
| 2019/0243151 A1 | 8/2019 | Hansen | |

(Continued)

OTHER PUBLICATIONS

U.S. Appl. No. 17/749,464 to Seder et al., filed on May 20, 2022.

(Continued)

*Primary Examiner* — Ryan D Howard
(74) *Attorney, Agent, or Firm* — Vivacqua Crane, PLLC

(57) ABSTRACT

A method of using a system for generating a centrally located floating image display includes displaying a first image including real-time social media information with a first display, receiving the first image with a first reflector, reflecting the first image with the first reflector, displaying, a second image including real-time social media information with a second display, receiving the second image with a second reflector, reflecting the second image with the second reflector, displaying first private information to the first passenger and second private information to the second passenger with a transparent display positioned between the first passenger and the first reflector and between the second passenger and the second reflector, receiving input from the first and second passengers with the system controller, and collecting images with an external scene camera.

20 Claims, 8 Drawing Sheets

(56) References Cited

U.S. PATENT DOCUMENTS

2021/0023948 A1   1/2021  Knittl et al.
2023/0039608 A1   2/2023  Ji et al.
2023/0375829 A1  11/2023  Seder et al.

OTHER PUBLICATIONS

U.S. Appl. No. 17/746,243 to Chang et al., filed on May 17, 2022.
U.S. Appl. No. 17/824,210 to Sharma et al., filed on May 25, 2022.
U.S. Appl. No. 17/842,253 to Chang et al., filed on Jun. 16, 2022.
U.S. Appl. No. 17/842,272 to Seder et al., filed on Jun. 16, 2022.
U.S. Appl. No. 17/888,767 to Sharma et al., filed on Aug. 16, 2022.

* cited by examiner

SOCIAL UTILIZATION OF CAMPFIRE DISPLAY

INTRODUCTION

The present disclosure relates to a system for generating a floating image viewable by a plurality of passengers within a vehicle.

Current entertainment systems within vehicles generally comprise a screen or monitor that is mounted within the vehicle for viewing by the passengers. Some systems include smaller individual screens, wherein each passenger has a screen for their personal viewing. Current systems that provide virtual holographic images do not include the ability for annotation and for information that cannot be embedded within the virtual holographic image to be presented with the virtual holographic image. In addition, current systems do not include tactile properties that allow a passenger to interact with the virtual holographic image, such as by making selections or choosing different images to view. Known systems incorporate inverse head-up-display architectures that use beams splitters that must be attached to structure within the vehicle compartment and must be constantly re-adjusted to accommodate height and position variations of the passengers within the vehicle compartment.

While current systems achieve their intended purpose, there is a need for a new and improved system for providing a floating three-dimensional image that appears centrally located within the vehicle to all the passengers within the vehicle.

SUMMARY

According to several aspects of the present disclosure, a method of using a system for generating a centrally located floating three-dimensional image display for a plurality of passengers positioned within a vehicle compartment includes displaying, with a first display of an image chamber in communication with a system controller, a first image including real-time social media information, receiving, with a first reflector individually associated with a first passenger, the first image from the first display, reflecting, with the first reflector, the first image to the first passenger, wherein the first passenger perceives the first image floating at a central location within the image chamber, displaying, with a second display of the image chamber in communication with a system controller, a second image including real-time social media information, receiving, with a second reflector individually associated with a second passenger, the second image from the second display, reflecting, with the second reflector, the second image to the second passenger, wherein the second passenger perceives the second image floating at the central location within the image chamber, displaying, with a transparent display in communication with the system controller and positioned between eyes of the first passenger and the first reflector and between the eyes of the second passenger and the second reflector, first private information to the first passenger within an image plane positioned in front of the first image floating at the central location within the image chamber and second private information to the second passenger within an image plane positioned in front of the second image floating at the central location within the image chamber, receiving, with the system controller, input from the first passenger and the second passenger, and collecting, with an external scene camera, images of an external environment outside the vehicle compartment.

According to another aspect, the receiving, with the system controller, input from the first passenger and the second passenger, further includes receiving, with the system controller, via the transparent display, input from the first passenger and the second passenger, receiving, with the system controller, via at least one first sensor, input comprising a position of a head and eyes of the first passenger, receiving, with the system controller, via at least one first gesture sensor, information related to gestures made by the first passenger, collecting, with the system controller, via a first microphone, audio input from the first passenger, and collecting, with the system controller, via a second microphone, audio input from the second passenger, and the method further including broadcasting, with the system controller, via a first zonal speaker, audio output for the first passenger, and broadcasting, with the system controller, via a second zonal speaker, audio output for the second passenger.

According to another aspect, the including real-time social media information within the first image and within the second image further includes, including within the first image and within the second image, live images from locations remote from the vehicle, and the displaying, with the transparent display, first private information and second private information further includes, including within the first and second private information displayed on the transparent display, annotations for the live image within the first and second images.

According to another aspect, the annotations displayed within the first private information and within the second private information are the same.

According to another aspect, the annotations displayed within the first private information are based on preferences of the first passenger and the annotations displayed within the second private information are based on preferences of the second passenger.

According to another aspect, the method further includes receiving, with the system controller, input from the first passenger to modify the first image, modifying, with the system controller, the first image based on the input received from the first passenger, and modifying, with the system controller, the second image based on the input from the first passenger.

According to another aspect, the including real-time social media information within the first image and within the second image further includes collecting, with the system controller, data related to the first passenger and data related to the second passenger, identifying, based on the data related to the first passenger and the data related to the second passenger, common interests of the first and second passengers, and selecting social media applications that include elements related to the identified common interests of the first and second passengers, and including real-time social media information from the selected social media applications within the first image and within the second image.

According to another aspect, the system controller is adapted to support social media applications that allow the first and second passengers to communicate with a remotely located person, wherein the including real-time social media information within the first image and within the second image further includes including, within the first image and the second image, a three-dimensional graphical representation of the remotely located person, the collecting, with the system controller, via the first microphone, audio input from the first passenger further includes receiving, via the first microphone, audible communications from the first passenger, the collecting, with the system controller, via the second microphone, audio input from the second passenger further includes receiving, via the second microphone, audible communications from the second passenger, and the broadcasting, with the system controller, via the first zonal speaker, audio output for the first passenger, and the broadcasting, with the system controller, via the second zonal speaker, audio output for the second passenger further includes broadcasting, via the first and second zonal speakers, audible communications from the remotely located person.

According to another aspect, the method further includes modifying the three-dimensional graphical representation of the remotely located person within the first and second image, such that the three-dimensional graphical representation of the remotely located person faces the first passenger when the system controller detects audible communication from the first passenger, and modifying the three-dimensional graphical representation of the remotely located person within the first and second image, such that the three-dimensional graphical representation of the remotely located person faces the second passenger when the system controller detects audible communication from the second passenger.

According to another aspect, the method further includes modifying the three-dimensional graphical representation of the remotely located person within the first and second image, such that the three-dimensional graphical representation of the remotely located person faces the first passenger when the system controller determines that audible communication from the remotely located person is directed to the first passenger, and modifying the three-dimensional graphical representation of the remotely located person within the first and second image, such that the three-dimensional graphical representation of the remotely located person faces the second passenger when the system controller determines that audible communication from the remotely located person is directed to the second passenger.

According to another aspect, the method further includes incorporating facial expressions and body language into the three-dimensional graphical representation of the remotely located person based on audible communication from the remotely located person.

According to another aspect, the method further includes receiving, with the system controller, via the at least one first sensor, input comprising a position of a head and eyes of the first passenger, receiving, with the system controller, via the at least one first gesture sensor, information related to gestures made by the first passenger, and receiving, with the system controller, via the transparent display, input from the first passenger, and navigating selectable options presented within the first image based on input from the first passenger collected by the transparent display, the at least one first sensor and the at least one gesture sensor.

According to several aspects of the present disclosure, a system for generating a centrally located floating three-dimensional image display for a plurality of passengers positioned within a vehicle compartment within a vehicle includes a system controller adapted to collect data related to a first passenger and data related to a second passenger, identify, based on the data related to the first passenger and the data related to the second passenger, common interests of the first and second passengers, and select social media applications that include elements related to the identified common interests of the first and second passengers, an image chamber including a first display adapted to project a first image including real-time social media information and live images from locations remote from the vehicle from the selected social media applications, a first reflector individually associated with the first display and a first one of the plurality of passengers, the first reflector adapted to receive the first image from the first display and to reflect the first image to the first passenger, wherein the first passenger perceives the first image floating at a central location within the image chamber, a second display adapted to project a second image including real-time social media information and live images from locations remote from the vehicle from the selected social media applications, and a second reflector individually associated with the second display and a second one of the plurality of passengers, the second reflector adapted to receive the second image from the second display and to reflect the second image to the second passenger, wherein, the second passenger perceives the second image floating at the central location within the image chamber, and a transparent touch screen display positioned between the first reflector and the first passenger and between the second reflector and the second passenger and adapted to display first private information, including annotations for the live image within the first image based on preferences of the first passenger, to the first passenger within an image plane positioned in front of the first image floating at the central location within the image chamber and to receive input from the first passenger, and adapted to display second private information, including annotations for the live image within the second image based on preferences of the second passenger, to the second passenger within an image plane positioned in front of the second image floating at the central location within the image chamber and to receive input from the second passenger, and an external scene camera adapted to collect images of an external environment outside the vehicle compartment, wherein, the system controller is adapted to receive, with the system controller, via the transparent display, input from the first passenger and the second passenger, receive, with the system controller, via at least one first sensor, input comprising a position of a head and eyes of the first passenger, receive, with the system controller, via at least one first gesture sensor, information related to gestures made by the first passenger, collect, with the system controller, via a first microphone, audio input from the first passenger, collect, with the system controller, via a second microphone, audio input from the second passenger, broadcast, with the system controller, via a first zonal speaker, audio output for the first passenger, and broadcast, with the system controller, via a second zonal speaker, audio output for the second passenger.

According to another aspect, the system controller is further adapted to receive input from the first passenger to modify the first image, modify the first image based on the input received from the first passenger, and modify the second image based on the input from the first passenger.

According to another aspect, the system controller is further adapted to support social media applications that allow the first and second passengers to communicate with a remotely located person, receive, via the first and second microphones, audible communications from the first and second passengers, and broadcast, via the first and second zonal speakers, audible communications from the remotely located person.

According to another aspect, the system controller is further adapted to include, within the first image and the second image, a graphical representation of the remotely located person, modify the three-dimensional graphical representation of the remotely located person within the first and second image, such that the three-dimensional graphical representation of the remotely located person faces the first passenger when the system controller detects audible communication from the first passenger, and faces the second passenger when the system controller detects audible communication from the second passenger, modify the three-dimensional graphical representation of the remotely located person within the first and second image, such that the three-dimensional graphical representation of the remotely located person faces the first passenger when the system controller determines that audible communication from the remotely located person is directed to the first passenger, and faces the second passenger when the system controller determines that audible communication from the remotely located person is directed to the second passenger, and incorporate facial expressions and body language into the three-dimensional graphical representation of the remotely located person based on audible communication from the remotely located person.

According to another aspect, the system controller is further adapted to receive, via the at least one first sensor, input comprising a position of a head and eyes of the first passenger, receive, via the at least one first gesture sensor, information related to gestures made by the first passenger, receive, via the transparent display, input from the first passenger, and navigate selectable options presented within the first image based on input from the first passenger collected by the transparent display, the at least one first sensor and the at least one first gesture sensor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
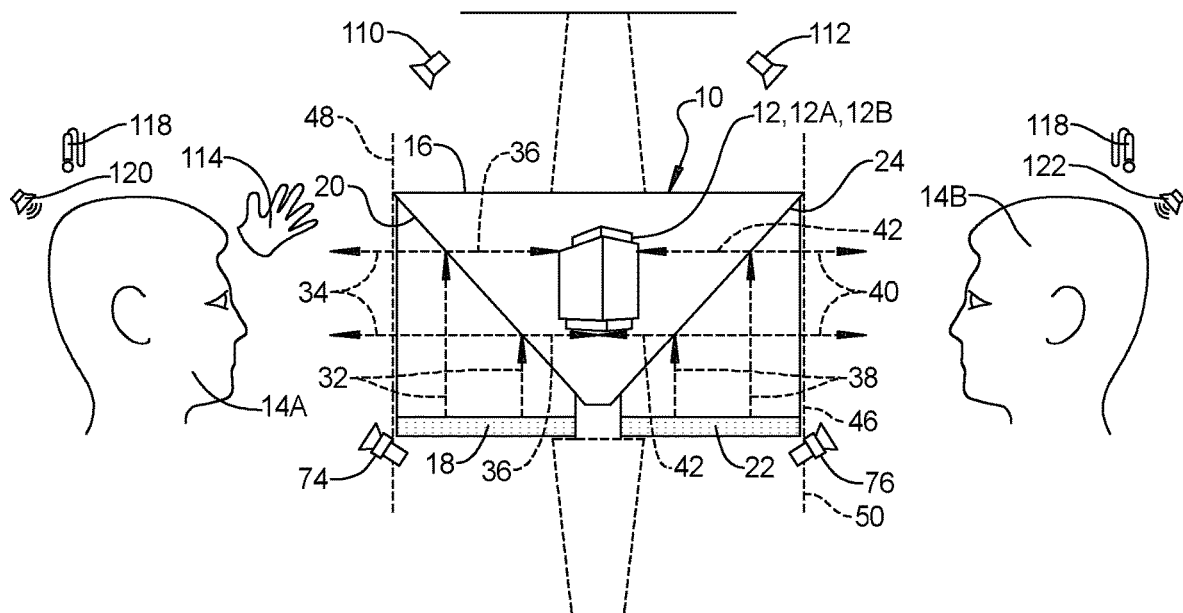
FIG. 1 is a schematic side view of a system in accordance with an exemplary embodiment of the present disclosure.

The figures are not necessarily to scale, and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 2:
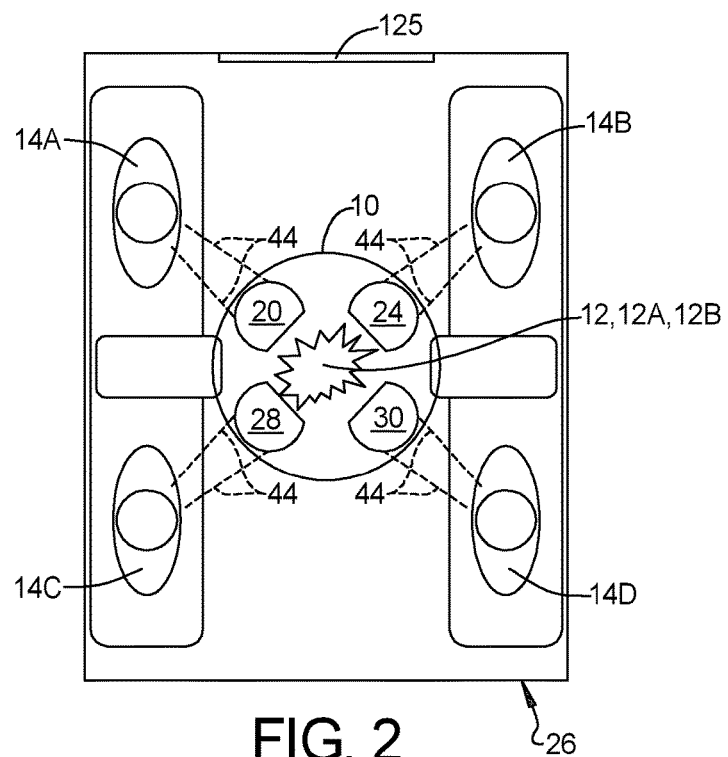
FIG. 2 is a schematic top view of a vehicle compartment having a system in accordance with an exemplary embodiment of the present disclosure.
Figure 3:
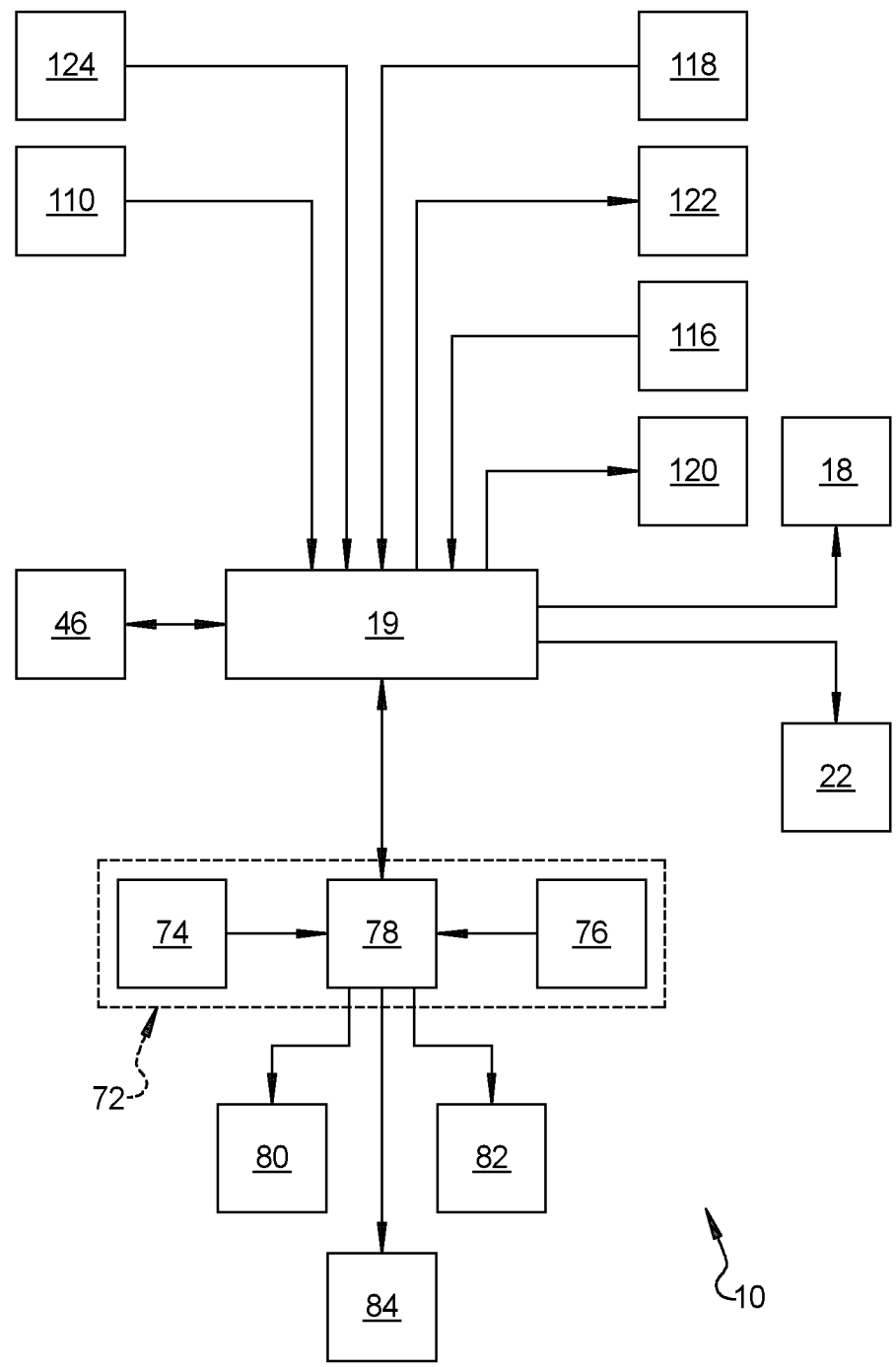
FIG. 3 is a schematic diagram of the system shown in FIG. 1.

Referring to FIG. 1, FIG. 2 and FIG. 3, a system 10 for generating a centrally located floating three-dimensional image 12 display for a plurality of passengers 14 positioned within a vehicle, includes an image chamber 16 that includes a first display 18 in communication with a system controller 19 and is adapted to project a first three-dimensional image 12A that includes real-time social media information, and a first reflector 20 individually associated with the first display 18 and a first one 14A of the plurality of passengers 14. The image chamber 16 further includes a second display 22 that is adapted to project a second three-dimensional image 12B that includes real-time social media information, and a second reflector 24 individually associated with the second display 22 and a second one 14B of the plurality of passengers 14. As shown in FIG. 1, the system 10 includes two displays 18, 22, reflectors 20, 24 and passengers 14A, 14B. It should be understood that the system 10 may be adapted to accommodate any suitable number of passengers 14.

The system controller 19 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Referring to FIG. 2, a vehicle compartment 26 includes a plurality of seating positions occupied by a plurality of passengers 14A, 14B, 14C, 14D. As shown in FIG. 2, the vehicle compartment 26 includes four seating positions for four passengers 14A, 14B, 14C, 14D. Each reflector 20, 24, 28, 30 is adapted to be viewed by one of the passengers 14A, 14B, 14C, 14D. Each reflector 20, 24, 28, 30 is adapted to receive an image from the associated display 18, 22, and to reflect the image to the associated passenger 14. The associated passenger 14 perceives the image 12 floating at a central location within the image chamber 16. Referring again to FIG. 1, the first reflector 20 is adapted to receive the first image 12A from the first display 18, as indicated by arrows 32, and to reflect the first image 12A to the first passenger 14A, as indicated by arrows 34, wherein the first passenger 14A perceives the first image 12A floating at a central location within the image chamber 16, as indicated by arrows 36. The second reflector 24 is adapted to receive the second image 12B from the second display 22, as indicated by arrows 38, and to reflect the second image 12B to the second passenger 14B, as indicated by arrows 40, wherein, the second passenger 14B perceives the second image 12B floating at the central location within the image chamber 16, as indicated by arrows 42.

Referring to FIG. 2, each of the four passengers 14A, 14B, 14C, 14D perceives an image 12 reflected to them by respective associated reflectors 20, 24, 28, 30 and the passengers 14A, 14B, 14C, 14D perceive the image 12 reflected to them within the image chamber 16, as indicated by lines 44. Each of the displays 18, 22 can project the same image to each of the reflectors 20, 24, 28, 30 and thus to each of the passengers 14A, 14B, 14C, 14D. Alternatively, each of the displays 18, 22 can display a different perspective of the same image, or a different image altogether to each of the reflectors 20, 24, 28, 30. Thus the system 10 is capable of presenting the same floating image 12 to all the passengers 14 so they can view simultaneously, or alternatively, each passenger 14 can view a different perspective of the floating image 12 or a completely different three-dimensional image 12.

A transparent display 46 is positioned between the eyes of each of the plurality of passengers 14 and the reflectors 20, 24, 28, 30. As shown in FIG. 1, the transparent display 46 is positioned between the first reflector 20 and the first passenger 14A and between the second reflector 24 and the second passenger 14B. The transparent display 46 is adapted to display information to the first and second passengers 14A, 14B within an image plane positioned in front of the perceived first and second images 12A, 12B floating at the central location within the image chamber 16. The transparent display 46 presents first private information to the first passenger 14A that appears within a first image plane 48, wherein the first private information displayed on the transparent display 46 to the first passenger 14A appears in front of the image 12A perceived by the first passenger 14A within the image chamber 16. The first private information is information meant to be seen only by the first passenger 14A. The transparent display 46 presents second private information to the second passenger 14B that appears within a second image plane 50, wherein second private information displayed on the transparent display 46 to the second passenger 14B appears in front of the image 12B perceived by the second passenger 14B within the image chamber 16. The second private information is information meant to be seen only by the second passenger 14B.

In an exemplary embodiment, the transparent display 46 is a transparent touch screen that is adapted to allow the plurality of passengers 14 to receive annotated information and to provide input to the system 10. Referring to FIG. 1 and FIG. 2, in an exemplary embodiment, the transparent display 46 includes a clear cylindrical touch screen. The clear cylindrical touch screen encircles the image chamber 16 and is thereby positioned between the eyes of the plurality of passengers 14 and the perceived image 12 floating at the central location within the image chamber 16. In an exemplary embodiment, the transparent display 46 is an organic light-emitting diode (OLED). It should be understood, that the transparent display 46 may be other types of transparent touch screen displays known in the art.

The transparent display 46 is adapted to present visible displayed information only to the passenger 14 that is directly in front of a portion of the transparent display 46. The nature of the transparent display 46 is such that the displayed information is only displayed on a first side, the outward facing cylindrical surface, of the transparent display 46. A second side, the inward facing cylindrical surface, of the transparent display 46 does not display information, and thus, when viewed by the other passengers 14, allows the other passengers 14 to see through the transparent display 46.

In an exemplary embodiment, the images from each of the displays 18, 22 are generated via holographic method, pre-computed and encoded into a hologram generator within the display 18, 22. In an exemplary embodiment, each display 18, 22 is adapted to project a three-dimensional image with variable virtual image distance. Three-dimensional images with variable virtual image distance allows the system 10 to project a floating image 12 to the passengers 14 with the capability of making the floating image 12 appear closer or further away from the passengers 14.

Referring again to FIG. 1, in an exemplary embodiment, the system is mounted to a support structure suspended from a roof 29 within the vehicle compartment 26. Alternatively, in another exemplary embodiment, the system is mounted to a support structure, such as a pedestal, mounted to a floor 31 within the vehicle compartment 26. In various embodiments, the system bay be retractable, wherein, when not in use, the system recesses within the roof 29 or the floor 31 within the vehicle compartment.

The transparent display 46 and each of the reflectors 20, 24, 28, 30 are transparent, wherein a passenger 14 can see through the transparent display 46 and an associated reflector 20, 24, 28, 30. This allows the passenger 14 to perceive the floating image 12 at a distance beyond the reflector 20, 24, 28, 30 and further, allows the passenger 14 to see through the transparent display 46 and the reflectors 20, 24, 28, 30 and able to see the interior of the vehicle compartment 26 and other passengers 14 therein.

In one exemplary embodiment, the transparent display 46 is an autostereoscopic display that is adapted to display stereoscopic, or three-dimensional images by adding binocular perception of three-dimensional depth without the use of special headgear, glasses, something that affects the viewer's vision, or anything for the viewer's eyes. Because headgear is not required, autostereoscopic displays are also referred to as "glasses-free 3D" or "glassesless 3D". The autostereoscopic transparent display includes a display panel and a parallax barrier mounted to the display panel, on an outwardly facing side of the display panel facing an associated one of the plurality of passengers 14. In an exemplary embodiment the parallax barrier that is mounted onto the transparent display 46 includes a plurality of parallel, vertical apertures, that divide the image displayed such that a left eye and a right eye of a passenger 14 viewing the autostereoscopic display see different portions of the displayed image and the passenger 14 perceives a three-dimensional image.

In an exemplary embodiment, the parallax barrier that is mounted onto the transparent display 46 is selectively actuatable by a controller adapted to switch between having the parallax barrier off, wherein the parallax barrier is completely transparent, and the viewing passenger 14 sees images displayed on the transparent display 46 as two-dimensional images, and having the parallax barrier on, wherein the viewing passenger 14 sees the images displayed on the transparent display 46 as a three-dimensional images.

When the parallax barrier is actuated, each of the left and right eyes of the viewing passenger 14 only see half of the displayed image, therefore, the resolution of the three-dimensional image is reduced. To improve resolution, in one exemplary embodiment, the controller is configured to implement time-multiplexing by alternately turning the parallax barrier on and off. Time-multiplexing requires the system 10 to be capable of switching the parallax barrier on and off fast enough to eliminate any perceptible image flicker by the viewing passenger 14. Liquid crystal displays are particularly suitable for such an application.

Figure 4:
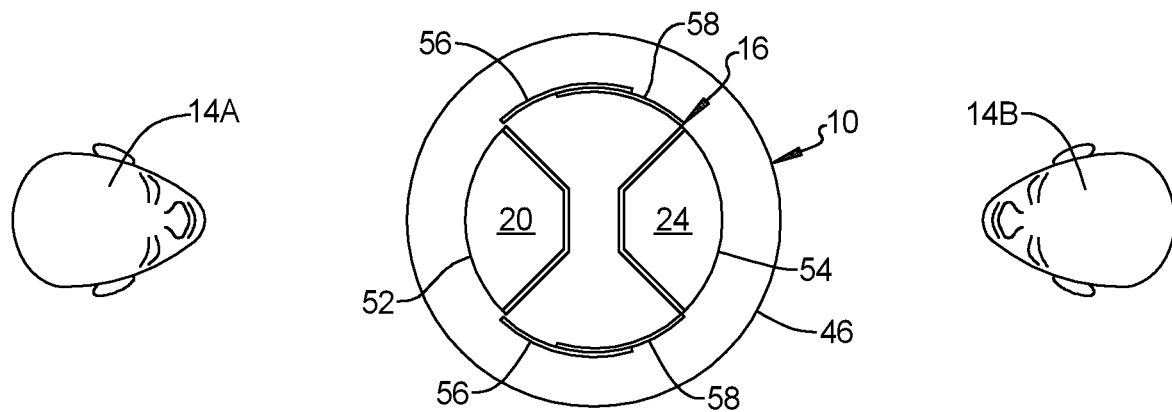
FIG. 4 is a schematic top view of the system shown in FIG. 1 with a first and second passenger.

Referring to FIG. 4, the image chamber 16 includes transparent portions 52, 54 to allow the passengers 14 to see their associated reflector 20, 24, 28, 30. As shown, the image chamber 16 includes a first transparent portion 52 that is adapted to allow the first image 12A reflected by the first reflector 20 to pass from the image chamber 16 outward toward the first passenger 14A, as indicated by arrows 34 in FIG. 1. Further, the image chamber 16 includes a second transparent portion 54 that is adapted to allow the second image 14B reflected by the second reflector 24 to pass from the image chamber 16 outward toward the second passenger 14B, as indicated by arrows 40 in FIG. 1.

The image chamber 16 further includes solid portions 56, 58 that are adapted to prevent light from entering the image chamber 16 behind the first and second reflectors 20, 24. The image chamber 16 functions much like a Pepper's Ghost Chamber, wherein the image of an object is perceived by a viewer within a reflective surface adjacent the actual image. As discussed above, in the present disclosure, the image presented by a display 18, 22 which is not within view of a passenger 14, is reflected by a reflector 20, 24, 28, 30 to the passenger 14A, 14B, 14C, 14D such that the passenger "sees" the image within the image chamber 16 and perceives the image 12 to be floating behind the reflective surface of the reflector 20, 24, 28, 30. If the image chamber 16 behind the reflectors 20, 24, 28, 30 is exposed to ambient light, the image will not be viewable by the passengers 14. Thus, solid portions 56, 58 of the image chamber 16 are adapted to prevent light from entering the image chamber 16 behind the first and second reflectors 20, 24. Referring to FIG. 4, the image chamber 16 includes solid overlapping panels 56, 58 that are adapted to prevent light from entering the image chamber 16 behind the first and second reflectors 20, 24.

Figure 5:
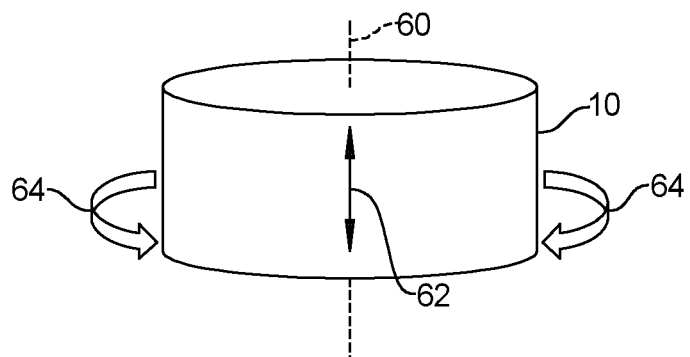
FIG. 5 is a schematic perspective view of the system shown in FIG. 1.

Referring to FIG. 5, in an exemplary embodiment, the system 10 is selectively moveable vertically up and down along a vertical central axis 60, as indicated by arrow 62. Further, each display 18, 22 and the associated reflector 20, 24, 28, 30 are unitarily and selectively rotatable about the vertical central axis 60, as shown by arrows 64. This allows the system 10 to adjust to varying locations of the passengers 14 within the vehicle compartment 26.

Figure 6:
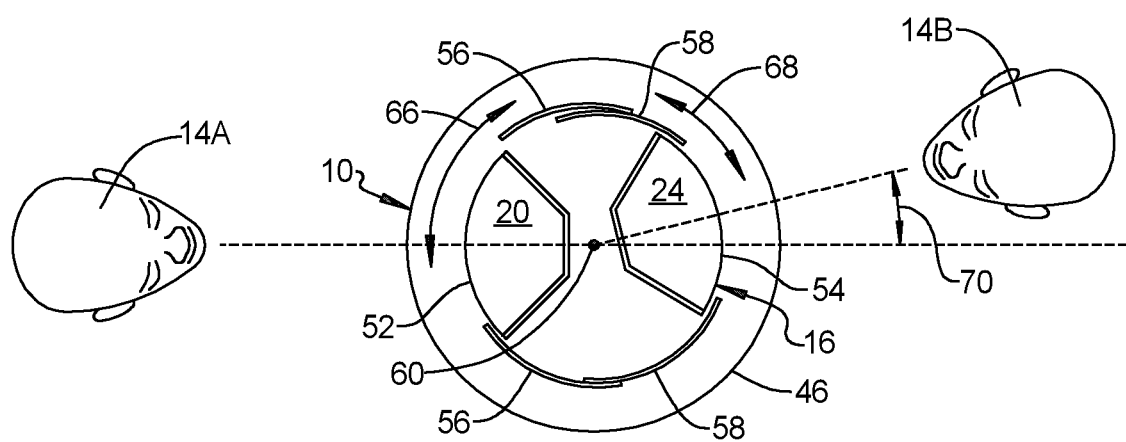
FIG. 6 is a schematic top view of the system shown in FIG. 3, wherein the position of the second passenger has moved.

Referring to FIG. 6, the first reflector 20 and the first display 18 are rotatable about the vertical central axis 60, as indicated by arrow 66. The second reflector 24 and the second display 22 are rotatable about the vertical central axis 60, as indicated by arrow 68. As shown in FIG. 4, the first and second passengers 14A, 14B are sitting directly across from one another, and the first reflector 20 and first display 18 are positioned 180 degrees from the second reflector 24 and second display 22. As shown in FIG. 6, the position of the head of the second passenger 14B has moved, and the second reflector 24 and the second display 22 have been rotated an angular distance 70 to ensure the second passenger 14B perceives the image 12 from the second display 22 and the second reflector 24.

In an exemplary embodiment, the image chamber 16 includes first solid panels 56 positioned adjacent the first reflector 20 on either side and adapted to move unitarily with the first reflector 20 and the first display 18 as the first reflector 20 and the first display 18 rotate about the vertical central axis 60. Second solid panels 58 are positioned adjacent the second reflector 24 on either side and are adapted to move unitarily with the second reflector 24 and the second display 22 as the second reflector 24 and the second display 22 rotate about the vertical central axis 60. The first solid panels 56 overlap the second solid panels 58 to allow relative movement of the first solid panels 56 relative to the second solid panels 58 and to ensure that ambient light is blocked from entering the image chamber 16 behind the first and second reflectors 20, 24 at all times.

In an exemplary embodiment, each of the displays 18, 22 and associated reflectors 20, 24, 28, 30 are equipped with head tracking capability, wherein an orientation of each display 18, 22 and associated reflector 20, 24, 28, 30 changes automatically in response to movement of a head and eyes of a passenger 14 detected by a monitoring system 72. Monitoring systems 72 within a vehicle include sensors 74 that monitor head and eye movement of a driver/passenger within the vehicle.

In an exemplary embodiment, the system 10 includes at least one first sensor 74 adapted to monitor a position of a head and eyes of the first passenger 14A. The at least one first sensor 74 may include camera and motion sensors adapted to detect the position and movement of the first passenger's head and eyes. As shown, the first sensors 74 include a camera oriented to monitor the position and movement of the head and eyes of the first passenger 14A. The first display 18 and first reflector 20 are adapted to rotate in response to movement of the head and eyes of the first passenger 14A. The system 10 further includes at least one second sensor 76 adapted to monitor a position of a head and eyes of the second passenger 14B. The at least one second sensor 76 may include camera and motion sensors adapted to detect the position and movement of a passenger's head and eyes. As shown, the second sensors 76 include a camera oriented to monitor the position and movement of the head and eyes of the second passenger 14B. The second display 22 and second reflector 24 are adapted to rotate about the vertical central axis 60 in response to movement of the head and eyes of the second passenger 14B.

Referring again to FIG. 3, a controller 78 of the monitoring system 72 is in communication with the system controller 19 and receives information from the first sensors 74, and in response to detection of head/eye movement by the first passenger 14A, actuates a first motor 80 adapted to rotate the first reflector 20 and first display 18 about the vertical central axis 60. Further, the controller 78 of the monitoring system 72 receives information from the second sensors 76, and in response to detection of head/eye movement by the second passenger 14B, actuates a second motor 82 adapted to rotate the second reflector 24 and second display 22 about the vertical central axis 60.

In addition to rotation of the first display 18 and first reflector 20 and the second display 22 and second reflector 24, the system 10 is adapted to move up and down along the vertical central axis 60 in response to movement of the head and eyes of the first passenger 14A and movement of the head and eyes of the second passenger 14B. The controller 78 of the monitoring system 72 receives information from the first sensors 74 and the second sensors 76, and in response to detection of head/eye movement by the first and second passengers 14A, 14B, actuates a third motor 84 adapted to raise and lower the system 10 along the vertical central axis 60 to maintain optimal vertical position of the system 10 relative to the passengers 14. Preferences may be set within the system 10 such that the system 10 maintains optimal vertical positioning relative to a designated one of the plurality of passengers 14, or alternatively, preferences can be set such that the system 10 maintains a vertical position taking into consideration some or all of the plurality of passengers 14.

In an exemplary embodiment, the monitoring system 72 is adapted to monitor the position of a head and eyes of each one of the plurality of passengers 14, wherein, for each of the plurality of passengers 14, the system 10 is adapted to display the first and second private information at a specific location on the transparent display 46 based on a position of the head and eyes of the passenger 14. In another exemplary embodiment, for each of the plurality of passengers 14, the system 10 is adapted to display information at a specific location on the transparent display 46 based on the position of the head and eyes of the passenger 14 relative to the perceived image 12 within the image chamber 16, such that, for each of the plurality of passengers 14, private information displayed on the transparent display 46 is properly positioned relative to the perceived image 12 within the image chamber 16.

Figure 7:
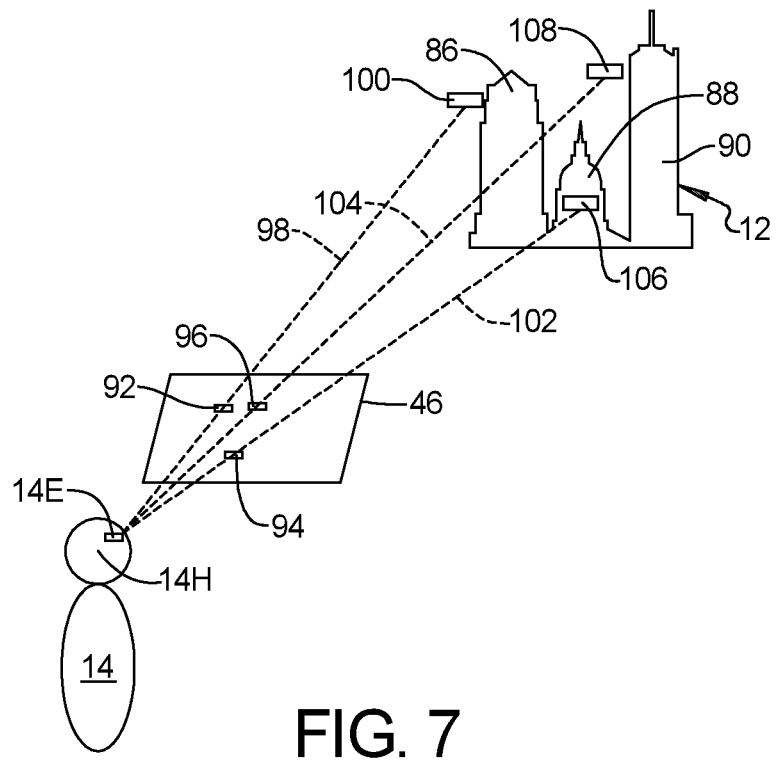
FIG. 7 is a schematic view illustrating a passenger viewing an image and annotation information through an associated beam splitter and passenger interface.

Referring to FIG. 7, in a schematic view of a passenger 14 an associated transparent display 46 and a floating image 12, the passenger 14 perceives the floating image 12 at a distance behind the transparent display 46. The transparent display 46 displays information related to the floating image 12 at a proper location on the transparent display 46 so the passenger 14 sees the information at a proper location relative to the floating image 12. As shown in FIG. 7, the floating image 12 is of a skyline, and more specifically, of three buildings, a first building 86, a second building 88, and a third building 90. The transparent display 46 displays first building information 92, second building information 94 and third building information 96.

The first building information 92 appears in a text box and may contain information about the first building 86 as well as the option of allowing the passenger 14 to touch the first building information 92 text box to acquire additional information about the first building 86. For example, the first building information 92 text box may contain the name of the first building 86 and the street address. The passenger 14 may opt to touch the first building information 92 text box, wherein additional information will appear on the transparent display 46, such as the date the first building 86 was built, what type of building (office, church, arena, etc.), or statistics such as height, capacity, etc. The second building information 94 and the third building information 96 also appear in text boxes that contain similar information and the option for the passenger 14 to touch the second or third building information 94, 96 text boxes to receive additional information about the second and third buildings 88, 90.

The monitoring system 72 tracks the position of the passenger's 14 head 14H and eyes 14E and positions the first, second and third building information 92, 94, 96 text boxes at a location on the transparent display 46, such that when the passenger 14 looks at the floating image 12 through the reflector 20, 24, 28, 30 and the transparent display 46, the passenger 14 sees the first, second and third building information 92, 94, 96 text boxes at the proper locations relative to the floating image 12. For example, the transparent display 46 positions the first building information 92 in the passenger's line of sight, as indicated by dashed line 98, such that the first building information 92 is perceived by the passenger 14 at a location immediately adjacent the first building 86, as indicated at 100. Correspondingly, the transparent display positions the second building information 94 in the passenger's line of sight, as indicated by dashed line 102, and the third building information 96 in the passenger's line of sight, as indicated by dashed line 104, such that the second and third building information 94, 96 is perceived by the passenger 14 at a location superimposed on the building, in the case of the second building 88, as indicated at 106, and at a location immediately adjacent the building, in the case of the third building 90, as indicated at 108.

The monitoring system 72 continuously tracks movement of the head 14H and eyes 14E of the passenger 14 and adjusts the position that the first, second and third building information 92, 94, 96 are displayed on the transparent display 46 to ensure that the passenger 14 always perceives the first, second and third building information 92, 94, 96 at the proper locations 100, 106, 108 relative to the floating image 12.

In an exemplary embodiment, the system 10 is adapted to accept input from a passenger 14 based solely on contact between the passenger 14 and the transparent display 46. For example, when a passenger 14 reaches out to touch a finger-tip to the transparent display 46, the transparent display 46 takes the input based solely on the point of contact between the tip of the finger of the passenger 14 and the transparent display 46.

In another exemplary embodiment, the system 10 is adapted to accept input from a passenger 14 based on contact between the passenger 14 and the transparent display 46 and based on the location of a point of contact between the passenger 14 and the transparent display 46 relative to the perceived image 12. For example, the monitoring system 72 tracks the movement and position of the passenger's 14 eyes 14E and head 14H. The transparent display 46 displays information that is perceived by the passenger 14 relative to the floating image 12, as discussed above. When the passenger 14 touches the transparent display 46, the passenger 14 perceives that they are touching the floating image 12. The system 10 uses parallax compensation to correlate the actual point of contact between the finger-tip of the passenger 14 on the transparent display 46 to the location on the floating image 12 that the passenger 14 perceives they are touching.

The system 10 may display, on the transparent display 46, multiple different blocks of annotated information relative to a floating image 12. As the passenger's 14 head 14H and eyes 14E move, the passenger's head 14H and eyes 14E will be positioned at a different distance and angle relative to the transparent display 46, thus changing the perceived location of displayed information relative to the image 12. By using parallax compensation techniques, such as disclosed in U.S. Pat. No. 10,318,043 to Seder, et al., hereby incorporated by reference herein, the system 10 ensures that when the passenger 14 touches the transparent display 46, the system 10 correctly identifies the intended piece of annotated information that the passenger 14 is selecting.

In another exemplary embodiment, the system 10 is adapted to accept input from a passenger 14 based on gestures made by the passenger 14 where the passenger 14 does not touch the transparent display 46. For example, when the passenger 14 moves a hand 114, or points to an object that is displayed on the transparent display 46 or to an object within the vehicle compartment 26 or outside of the vehicle compartment 26.

Referring again to FIG. 1, in an exemplary embodiment, the system includes at least one first gesture sensor 110 adapted to monitor position and movement of arms, hands and fingers 114 of the first passenger 14A and to gather data related to gestures made by the first passenger 14A. The first gesture sensor 110 may include a camera and motion sensors adapted to detect the position and movement of the first passenger's arms, hands and fingers. As shown, the first gesture sensor 110 includes a camera oriented to monitor the position and movement of the arms, hands and fingers of the first passenger 14A. Further, the system 10 includes a second gesture sensor 112 adapted to monitor position and movement of arms, hands and fingers of the second passenger 14B and to gather data related to gestures made by the second passenger 14B. The second gesture sensor 112 may include a camera and motion sensors adapted to detect the position and movement of the second passenger's arms, hands and fingers. As shown, the second gesture sensor 112 includes a camera oriented to monitor the position and movement of the arms, hands and fingers of the second passenger 14B.

The system 10 uses data collected by the first and second gesture sensors 110, 112 to identify gestures made by the passengers 14A, 14B within the vehicle compartment 26. A system controller will use computer learning algorithms and parallax compensation techniques to interpret such gestures and identify input data, such as when a passenger 14 is pointing to an object outside the vehicle compartment 26.

In another exemplary embodiment, the system 10 is adapted to accept audio input from passengers 14 within the vehicle compartment 26. Referring to FIG. 1, the system 10 includes a first microphone 116, in communication with the system controller 19, that is adapted to collect audio input from the first passenger 14A. Correspondingly, the system 10 includes a second microphone 118, in communication with the system controller 19, that is adapted to collect audio input from the second passenger 14B. The system controller 19 is adapted to recognize pre-determined commands from the passengers 14A, 14B within the vehicle compartment 26 when such commands are vocalized by the passengers 14A, 14B and picked-up by the first and second microphones 116, 118.

Further, the system 10 includes a first zonal speaker 120 adapted to broadcast audio output to the first passenger 14A. The first zonal speaker 120 is adapted to broadcast audio output in a manner such that only the first passenger 14A can hear and understand the audio output from the first zonal speaker 120. In this manner, audio information can be broadcast, by the system controller 19, to the first passenger 14A that is private to the first passenger 14A and does not disturb other passengers within the vehicle compartment 26. The system 10 includes a second zonal speaker 122 adapted to broadcast audio output to the second passenger 14B. The second zonal speaker 122 is adapted to broadcast audio output in a manner such that only the second passenger 14B can hear and understand the audio output from the second zonal speaker 122. In this manner, audio information can be broadcast, by the system controller 19, to the second passenger 14B that is private to the second passenger 14B and does not disturb other passengers within the vehicle compartment 26. The first and second zonal speakers 120, 122 may comprise speakers that are mounted within the vehicle compartment 26 and to broadcast audio output directionally to a specified location within the vehicle compartment 26. Further, the first and second zonal speakers 120, 122 may comprise a wireless headset or ear-bud adapted to be worn by the passengers 14A, 14B.

In an exemplary embodiment, the system 10 further includes an external scene camera 124 that is in communication with the system controller 19 and is adapted to capture images of an external environment outside the vehicle compartment 26. In this manner, the system controller 19 can collect data and "see" objects, locations, destinations and points of interest immediately outside the vehicle compartment 26.

The first and second three-dimensional images 12A, 12B include real time social media information 126 that is pulled from social media applications. Social media applications include, but are not limited to, social networking applications, such as Facebook or Twitter, professional meeting applications, such as Zoom or Teams, and entertainment applications that provide movies, music, news broadcasts or weather broadcasts. In an exemplary embodiment, the social media information 126 displayed within the first and second images 12A, 12B include live images 128 or video from a location that is remote from the vehicle, and the first and second private information displayed on the transparent display 46 includes annotations 130 for the live image 128 within the first and second images 12A, 12B.

Figure 8:
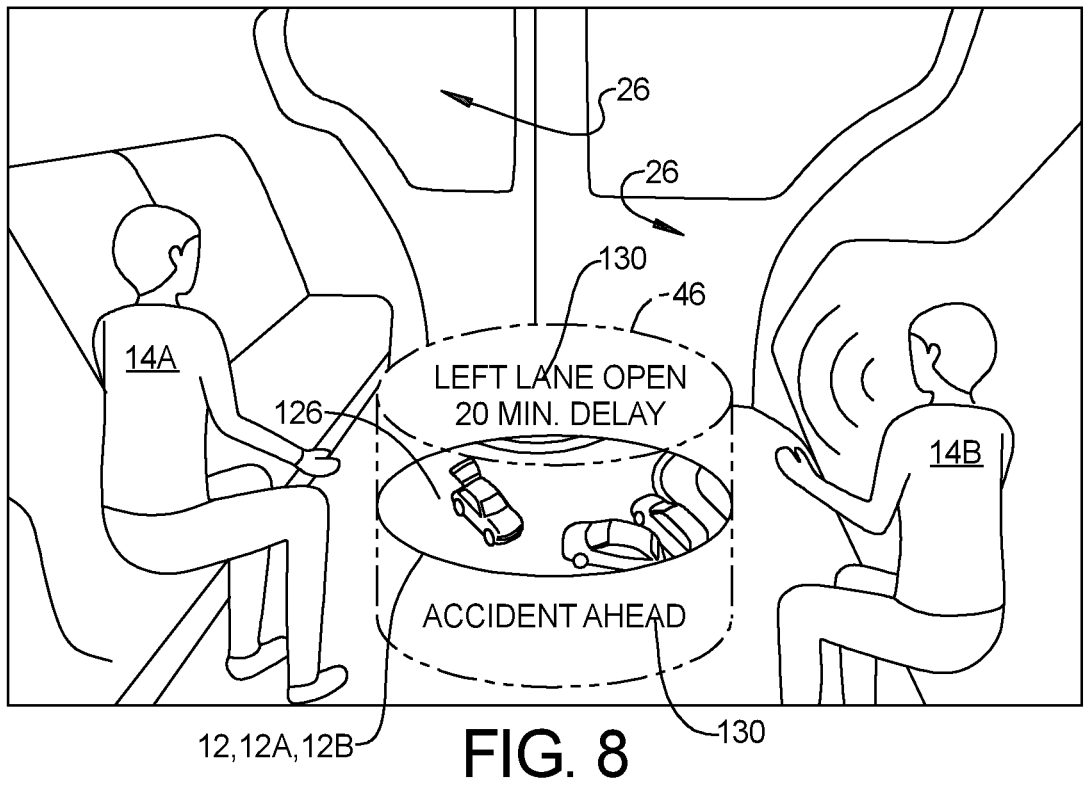
FIG. 8 is a schematic view of a system in accordance with the present disclosure wherein traffic information is being displayed within first and second images.

For example, referring to FIG. 8 the first and second passengers 14A, 14B are viewing a live image 128 from a social media application that provides traffic information. The live image 128 may be captured by infrastructure cameras, drone cameras or web-cams that are accessed by the social media application. The system controller 19, via communication with the social media application, can request live images 128 that are relevant to the first and second passenger 14A, 14B based on an actual route of the vehicle that is accessed within a navigation system of the vehicle in communication with the system controller 19. Alternatively, the system controller 19, along with the navigation system, may select a location that the system controller 19 predicts is along the route of the vehicle based on the current direction of travel and location. The annotations 130 to the live image 128 includes an alert that is positioned on the transparent display at a location so the alert appears below the live image 128. As shown, the alert includes the words "Accident Ahead". For purposes of description, FIG. 8 only includes one displayed alert with the words "Accident Ahead", however, it should be understood, that the annotation 130 including the alert with words "Accident Ahead" would be displayed within each of the first private information at a location on the transparent display 46 for viewing by the first passenger as well as within the second private information at a location on the transparent display 46 for viewing by the second passenger.

In addition, the annotations 130 to the live image 128 includes information related to the traffic situation that is positioned on the transparent display at a location so the information appears above the live image 128. As shown, the information includes textual information "Left Lane Open 20 min. delay". For purposes of description, FIG. 8 only includes one displayed alert with the words "Left Lane Open 20 min. delay", however, it should be understood, that the annotation 130 including the alert with words "Left Lane Open 20 min. delay" would be displayed within each of the first private information at a location on the transparent display 46 for viewing by the first passenger as well as within the second private information at a location on the transparent display 46 for viewing by the second passenger.

As discussed above, the monitoring system 72 continuously tracks movement of the head 14H and eyes 14E of each of the first and second passengers 14A, 14B and adjusts the position that the annotations 130 are displayed within the first and second private information on the transparent display 46 to ensure that the first and second passengers 14A, 14B always perceive the annotations 130 at the proper locations relative to the live image 128.

Figure 9:
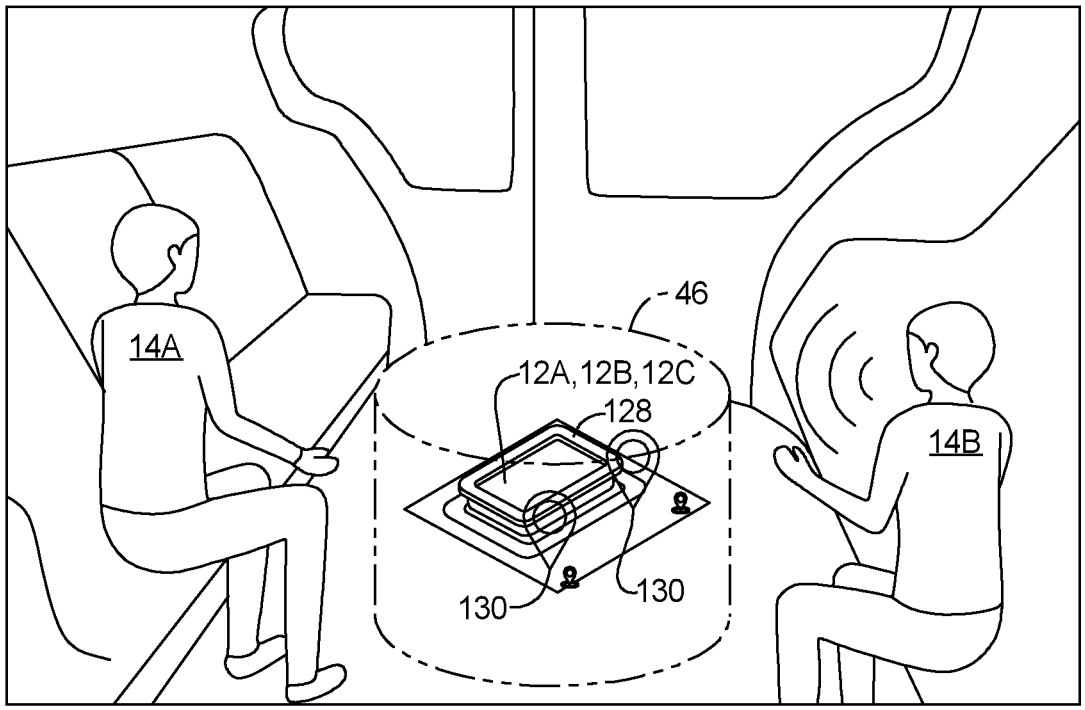
FIG. 9 is a schematic view of the system shown in FIG. 8, wherein drop-off locations as an arena are being displayed within first and second images.

Referring to FIG. 9, in another example, the first and second passengers 14A, 14B are viewing a live image 128 from a social media application, such as the website for an arena where an event is taking place. The live image 128 may be captured by infrastructure cameras at the arena. The system controller 19, may access the social media application (arena website) and, via communication with the social media application, can request live images 128 based on a request of either of the first and second passengers 14A, 14B, or based on information from the navigation system within the vehicle, indicating that the arena is the final destination for the first and second passengers 14A, 14B. The annotations 130 to the live image 128 include an indication of two designated drop-off sites at the arena that are positioned on the transparent display at a location so the designated drop-off sites, when viewed by the first and second passengers 14A, 14B, appear properly located relative to the live image 128 of the arena within the first and second images 12A, 12B. For purposes of description, FIG. 9 only includes one displayed annotation 130 of each of the two designated drop-off sites, however, it should be understood, that the annotation 130 would be displayed within the first private information at a location on the transparent display 46 for viewing by the first passenger as well as within the second private information at a location on the transparent display 46 for viewing by the second passenger.

Figure 10:
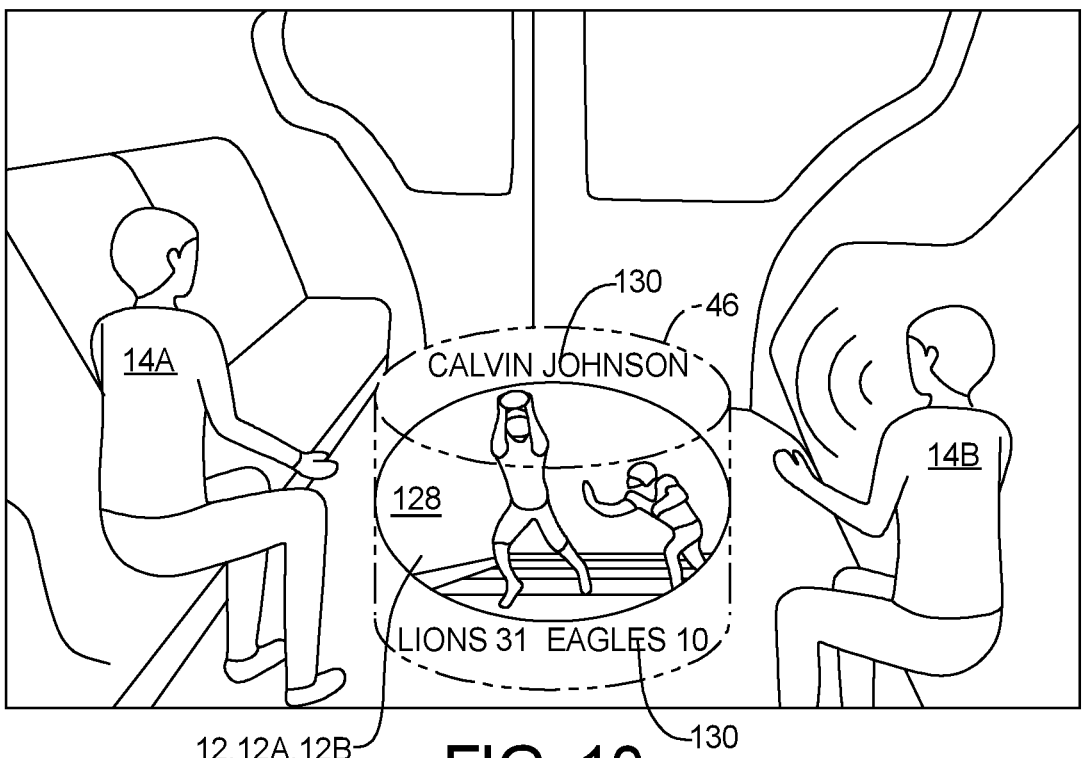
FIG. 10 is a schematic view of the system shown in FIG. 8, wherein a football game is being displayed within first and second images and annotations for the football game are displayed on a transparent display.
Figure 11:
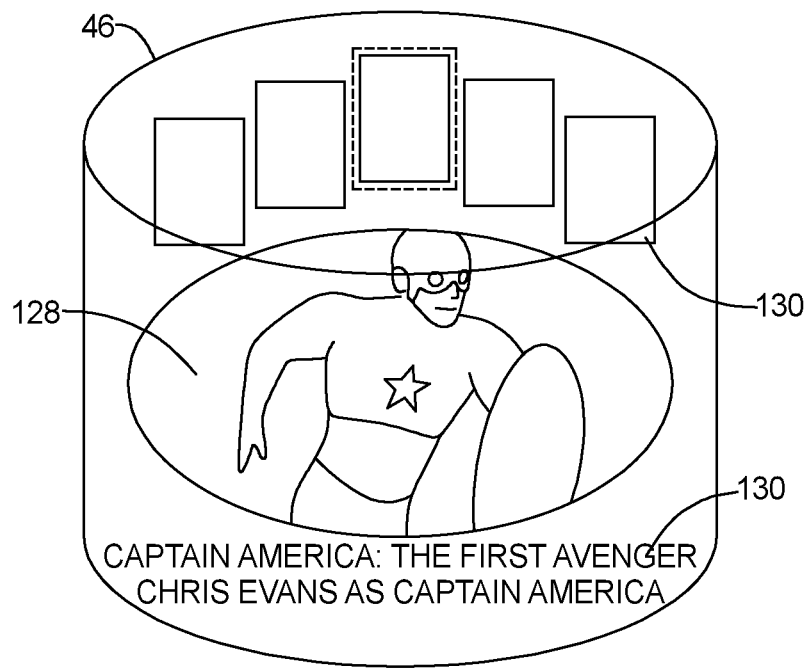
FIG. 11 is a schematic view of the system shown in FIG. 8, wherein a movie is being displayed within the first and second images and annotations for the movie are displayed on the transparent display.

Referring to FIG. 10, in another example, the first and second passengers 14A, 14B are viewing a live image 128 from a social media application, such as a broadcast of a football game. The annotations 130 to the live image 128 include a score of the game, positioned to appear below the live image 128, and, as shown in FIG. 10, the name of the player that is currently shown on the live image 128, positioned above the live image 128. Referring to FIG. 11, in another example, the first and second passengers 14A, 14B are viewing a live image 128 from a social media application, such as a broadcast of a movie. The system controller 19 accesses the movie, via the internet, from a social media application such as Hulu, HBO, or Disney Plus. The annotations 130 to the live image 128 include, as shown in FIG. 11, the title of the movie with identification of the lead actor, displayed below the live image 128, and pictorial images representing other movies related to the current movie being displayed, above the live image 128, such as other movies in which the lead actor appears, or other movies in a series of related movies. Thus, the system 10 provides an interactive environment that allows the passengers 14A, 14B within the vehicle compartment 26 to view any type of entertainment, such as, but not limited to, movie, video podcasts, concerts, streaming media content, broadcasts, satellite television programs, news, sporting events, weather forecasts, stocks/investment performance, etc.

As shown in FIG. 8, FIG. 9, FIG. 10 and FIG. 11, the annotations are common to each of the first and second passengers 14A, 14B, and the annotations are included within the first private information displayed on the transparent display 46 for viewing by the first passenger 14A, and the annotations are also included within the second private information displayed on the transparent display 46 for viewing by the second passenger 14B. Alternatively, the annotations displayed within the first private information for viewing by the first passenger 14A are based on preferences of the first passenger and are unique from annotations displayed within the second private information for viewing by the second passenger 14B which are based on preferences of the second passenger 14B.

Figure 12:
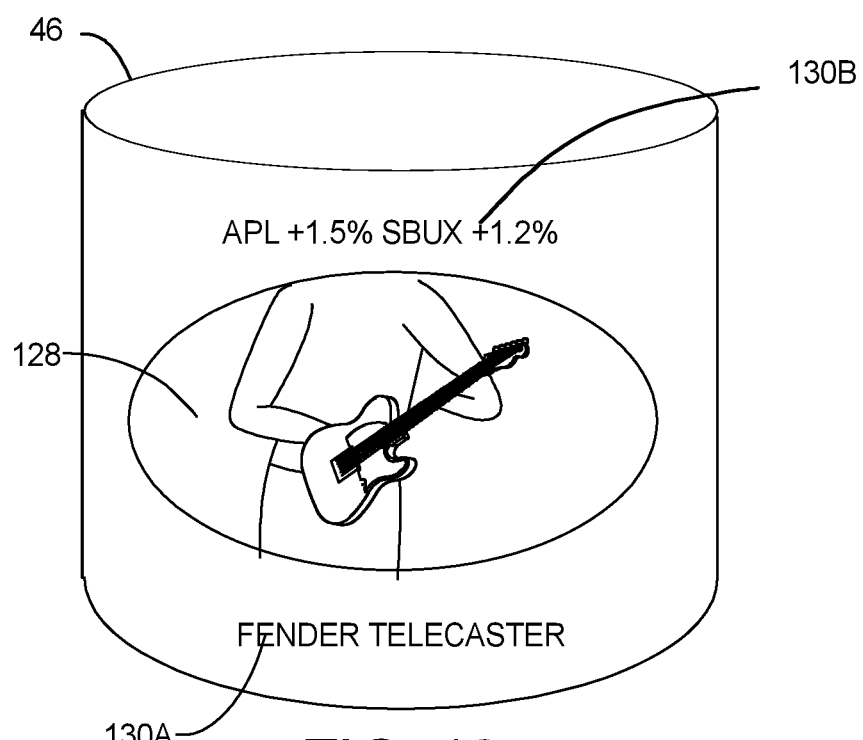
FIG. 12 is a schematic view of the transparent display of the system shown in FIG. 8, wherein a concert is displayed for the first and second passengers within the first and second images and annotations including a stock ticker for viewing only by the first passenger are displayed on the transparent display for the first passenger.

Referring to FIG. 12, the live image 128 included within the first and second images 12A, 12B includes a live concert that is being viewed by both the first and second passengers 14A, 14B. A first annotation 130A, includes information related to the concert, as shown, the type of guitar being played by the lead guitarist ("Fender Telecaster"), displayed below the live image 128. The first annotation 130A is displayed within both the first private information for viewing by the first passenger 14A and the second private information for viewing by the second passenger 14B. However, the first passenger 14A, may be a stock-broker, and want to view a stock ticker while watching the concert within the live image 128. Thus, a second annotation 130B includes a stock ticker, and is displayed above the live image 128 of the concert within only the first private information, for viewing only by the first passenger 14A.

In an exemplary embodiment, the system controller 19 is adapted to receive input from the first passenger 14A to modify the first image 12A, to modify the first image 12A based on the input received from the first passenger 14A, and to modify the second image 12B based on the input from the first passenger 14A. Thus, the first passenger 14A can modify, such as by changing the orientation or perspective of the live image 128 within the first image 12A, and the system controller 19 automatically or selectively applies such modifications to the live image 128 within the second image 12B, such that the first and second passengers 14A, 14B continue to see the same live image 128 within the first and second images 12A, 12B.

In another exemplary embodiment, the system controller 19 is adapted to collect data related to the first passenger 14A and data related to the second passenger 14B. Information related to the first and second passengers 14A, 14B can be collected based on direct input by the first and second passengers 14A, 14B, or, such information may be pulled from a database within the system controller 19 where information related to the first and second passengers 14A, 14B is stored based on past behavior. Further, the system may be adapted to prompt a passenger for personal interests.

The system controller is further adapted to identify, based on the data related to the first passenger 14A and the data related to the second passenger 14B, common interests of the first and second passengers 14A, 14B, to select social media applications that include elements related to the identified common interests of the first and second passengers 14A, 14B, and, to includes real-time social media information from the selected social media applications within the first image 12A and within the second image 12B.

Figure 13:
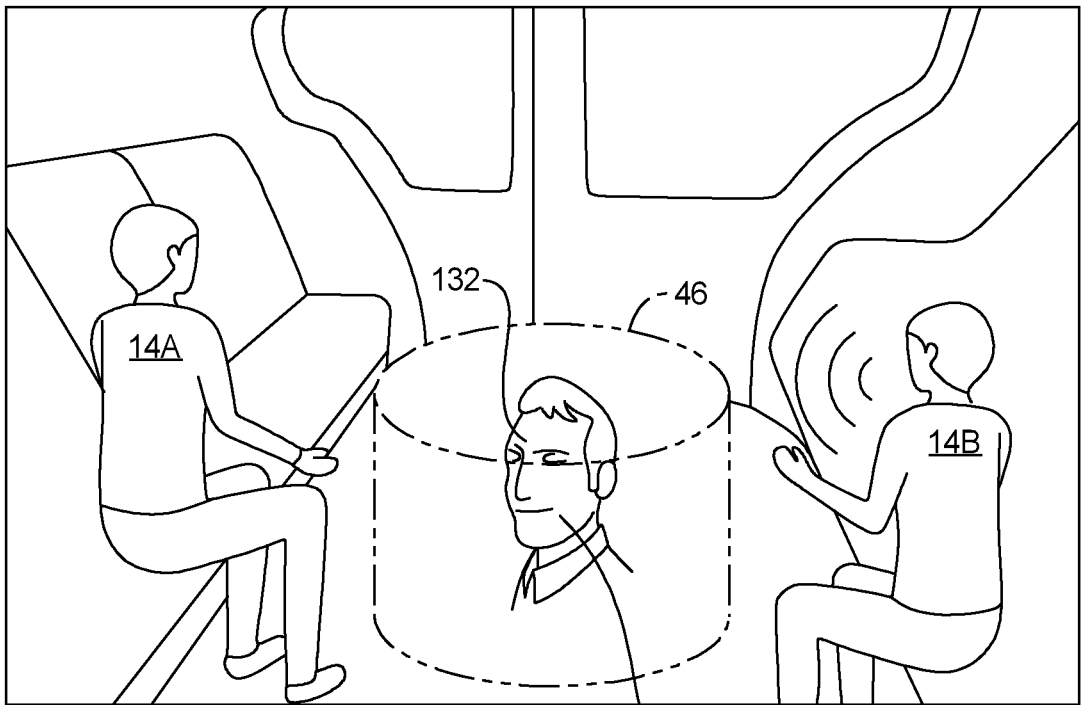
FIG. 13 is a schematic view of the system shown in FIG. 8, wherein a three-dimensional graphical representation of a remotely located person is displayed within the first and second images.

In yet another exemplary embodiment, the system controller 19 is further adapted to support social media applications that allow the first and second passengers 14A, 14B to communicate with a remotely located person. Referring to FIG. 13, the system controller 19, includes, within the first image 12A and the second image 12B, a three-dimensional graphical representation 132 of a remotely located person. The system controller 19 is further adapted to receive, via the first and second microphones 116, 118, audible communications from the first and second passengers 14A, 14B and send such audible communications from the first and second passengers 14A, 14B to the remotely located person via wireless communication between the system controller 19 and a system utilized by the remotely located person. The system controller 19 is further adapted to broadcast, via the first and second zonal speakers 120, 122, audible communications from the remotely located person to the first and second passengers 14A, 14B.

The system controller 19 can present the three-dimensional graphical representation 132 with various different aspects. For example, the three-dimensional graphical representation 132 can be an actual virtual image of the remotely located person, or the three-dimensional graphical representation 132 can be a caricature or cartoon avatar that resembles the remotely located person. Further, the three-dimensional graphical representation 132 can include only a head of the remotely located person, an upper torso, including the head of the remotely located person, or a full body image of the remotely located person. The system controller 19 can apply features such as raster effects, filters and dynamic noise to the displayed three-dimensional graphical representation 132.

Figure 14:
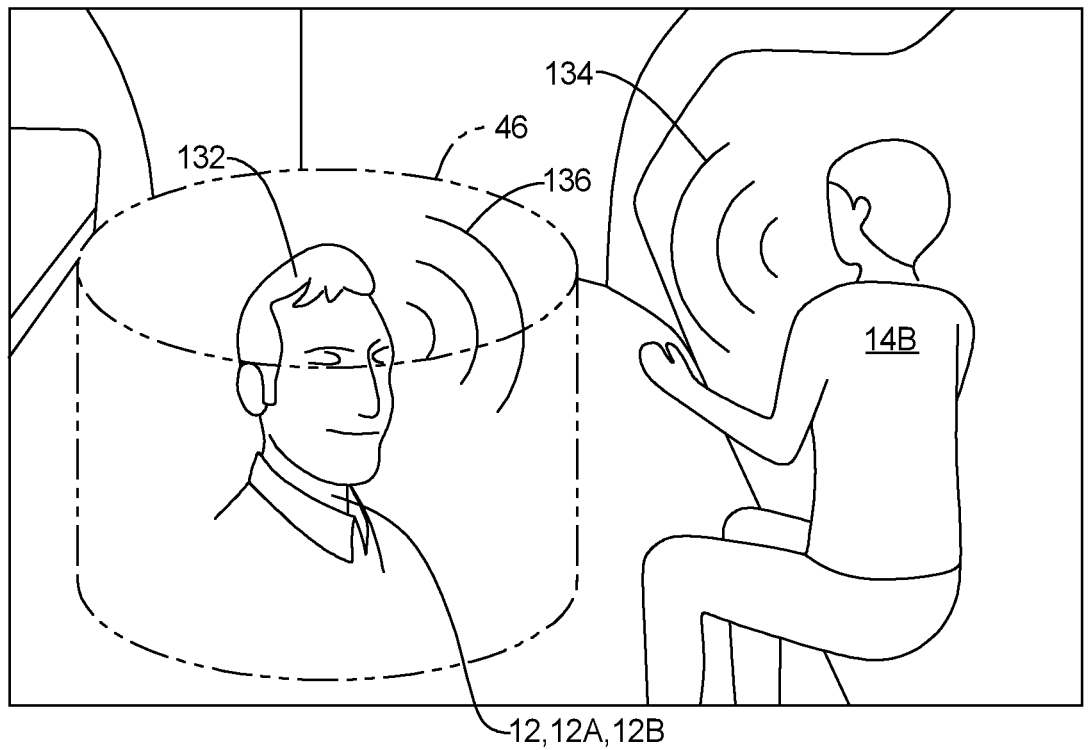
FIG. 14 is the schematic view shown in FIG. 13, wherein the orientation of the three-dimensional graphical representation is modified to face the second passenger.
Figure 15:
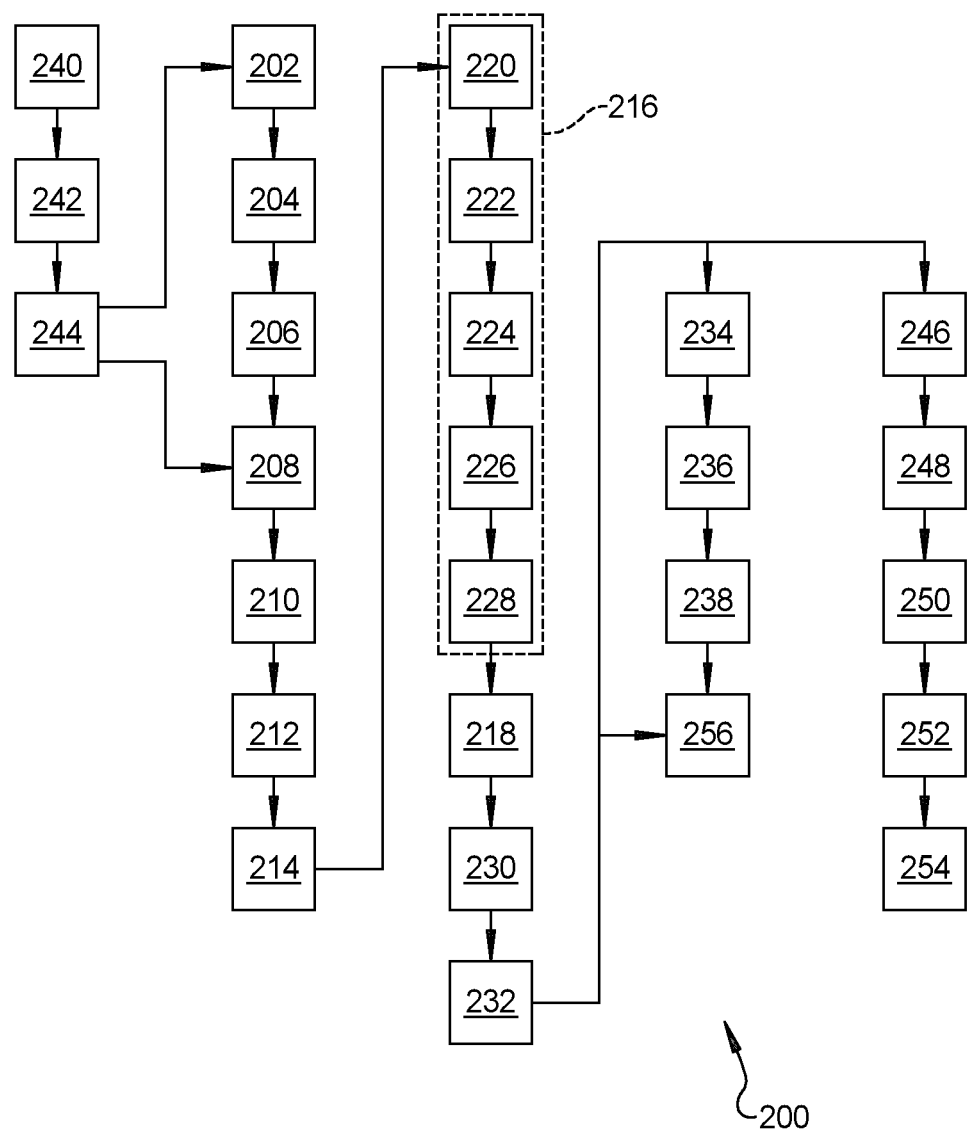
FIG. 15 is a flow chart illustrating a method of using the system of the present disclosure.

Referring to FIG. 14, in another exemplary embodiment, the system controller 19 is adapted to modifying the three-dimensional graphical representation 132 of the remotely located person within the first and second image 12A, 12B, such that the three-dimensional graphical representation 132 of the remotely located person faces the first passenger 14A when the system controller 19 detects audible communication from the first passenger 14A, and the three-dimensional graphical representation 132 of the remotely located person faces the second passenger 14B when the system controller 19 detects audible communication from the second passenger 14B.

For example, as shown in FIG. 13, the system controller 19 detects audible communication input via the first microphone, and thus, from the first passenger, and therefore, the system controller 19 displays the three-dimensional graphical representation 132 of the remotely located person and oriented such that the three-dimensional graphical representation 132 faces the first passenger 14A. Referring to FIG. 14, when the second passenger 14B speaks, as indicated at 134, the system controller 19 modifies the orientation of the three-dimensional graphical representation 132 of the remotely located person such that the three-dimensional graphical representation 132 faces the second passenger 14B. This makes the communication between the first and second passengers 14A, 14B and the remotely located person more realistic.

Furthermore, the system controller 19 is adapted to modify the three-dimensional graphical representation 132 of the remotely located person within the first and second image 12A, 12B, such that the three-dimensional graphical representation 132 of the remotely located person faces the first passenger 14A when the system controller 19 determines that audible communication from the remotely located person is directed to the first passenger 14A, and the three-dimensional graphical representation 132 of the remotely located person faces the second passenger 14B when the system controller 19 determines that audible communication from the remotely located person is directed to the second passenger 14B.

The system controller is adapted to analyze the audible communications from the remotely located passenger, and when the system controller 19 detects audible communication from the remotely located passenger that gives insight to whom the communication is directed, the system controller modifies the three-dimensional graphical representation 132 accordingly. For example, referring to FIG. 13, the remotely located passenger may has started out the conversation with "Hello Roger", where Roger is the name of the first passenger 14A. The system controller 19, thus, determines that the remotely located passenger is talking to the first person, and orients the three-dimensional graphical representation 132 to face the first person. Referring to FIG. 14, during the conversation, the system controller 19 detects audible communication from the remotely located passenger, such as "How do you feel about that, Linda?", as indicated at 136. The system controller 19, analyzes the audible communication, and based upon the question to "Linda", where Linda is the second passenger 14B, the system controller 19 determines that the remotely located person is now talking to the second passenger 14B, and modifies the orientation of the three-dimensional graphical representation of the remotely located person to face the second passenger 14B.

The system controller 19 is further adapted to incorporate facial expressions and body language into the three-dimensional graphical representation 132 of the remotely located person based on audible communication from the remotely located person. The system controller 19 is adapted to analyze tempo, volume and nature of the content of audible communications received from the remotely located person, and to approximate a mood of the remotely located person. The system controller modifies the three-dimensional graphical representation 132 to add facial expressions and body language that go along with the mood of the remotely located person. For Example, as shown in FIG. 13 and FIG. 14, the three-dimensional graphical representation 132 shows the remotely located person with a pleasant expression and smile on his face. The system controller 19 has approximated that the mood of the remotely located person is pleasant based on a soothing tone, reasonable volume and slow tempo of the audible communication received from the remotely located person. Alternatively, if the system controller 19 detects gritty/loud communication and the tone of the conversation is aggressive and the tempo increased, the system controller will determine that the remotely located person is angry and modify the displayed three-dimensional graphical representation 132 with appropriate facial expressions to match the angry mood of the conversation.

In another exemplary embodiment, the system controller is further adapted to receive via the at least one first sensor 74, input comprising a position of a head and eyes of the first passenger 14A, and to receive, via the at least one first gesture sensor 110, information related to gestures made by the first passenger 14A, and to receive, via the transparent display 46, input from the first passenger 14A to navigate selectable options presented within the first image 12A based on input from the first passenger 14A collected by the transparent display 46, the at least one first sensor 74 and the at least one gesture sensor 110. Thus, the system controller 19, when selectable options are displayed for the first passenger 14A continuously monitors the actions of the first passenger 14A to detect input by the first passenger 14A, either directly, by touching the transparent display 46, or passively, by making gestures and looking at a displayed element.

Referring to FIG. 11, a method 200 of using a system 10 for generating a centrally located floating three-dimensional image display for a plurality of passengers 14 positioned within a vehicle compartment 26 includes, beginning at block 202, displaying, with a first display 18 of an image chamber 16 in communication with a system controller 19, a first image 12A including real-time social media information, moving to block 204, receiving, with a first reflector 20 individually associated with a first passenger 14A, the first image 12A from the first display 18, and, moving to block 206, reflecting, with the first reflector 20, the first image 12A to the first passenger 14A, wherein the first passenger 14A perceives the first image 12A floating at a central location within the image chamber 16.

Moving to block 208, the method 200 further includes displaying, with a second display 22 of the image chamber 16 in communication with the system controller 19, a second image 12B including real-time social media information, moving to block 210, receiving, with a second reflector 24 individually associated with a second passenger 14B, the second image 12B from the second display 22, and, moving to block 212, reflecting, with the second reflector 24, the second image 12B to the second passenger 14B, wherein the second passenger 14B perceives the second image 12B floating at the central location within the image chamber 16.

Moving to block 214, the method 200 includes displaying, with a transparent display 46 in communication with the system controller 19 and positioned between eyes of the first passenger 14A and the first reflector 20 and between the eyes of the second passenger 14B and the second reflector 24, first private information to the first passenger 14A within an image plane 48 positioned in front of the first image 12A floating at the central location within the image chamber 16 and second private information to the second passenger 14B within an image plane 50 positioned in front of the second image 12B floating at the central location within the image chamber 16.

Moving to block 216, the method 200 includes receiving, with the system controller 19, input from the first passenger 14A and the second passenger 14B. Moving to block 218, the method 200 includes collecting, with an external scene camera 124, images of an external environment outside the vehicle compartment 26.

In an exemplary embodiment, the receiving, with the system controller 19, input from the first passenger 14A and the second passenger 14B, at block 216, further includes, moving to block 220, receiving, with the system controller 19, via the transparent display 46, input from the first passenger 14A and the second passenger 14B, moving to block 222, receiving, with the system controller 19, via at least one first sensor 74, input comprising a position of a head and eyes of the first passenger 14A, moving to block 224, receiving, with the system controller 19, via at least one first gesture sensor 110, information related to gestures made by the first passenger 14A, moving to block 226, collecting, with the system controller 19, via a first microphone 116, audio input from the first passenger 14A, and, moving to block 228, collecting, with the system controller 19, via a second microphone 118, audio input from the second passenger 14B.

Moving to block 230, the method 200 further includes broadcasting, with the system controller 19, via a first zonal speaker 120, audio output for the first passenger 14A, and, moving to block 232, broadcasting, with the system controller 19, via a second zonal speaker 122, audio output for the second passenger 14B.

In an exemplary embodiment, the including real-time social media information within the first image 12A, at block 202, and within the second image 12B, at block 208, further includes, including within the first image 12A and within the second image 12B, live images 128 from locations remote from the vehicle, and the displaying, with the transparent display 46, first private information and second private information further includes, including within the first and second private information displayed on the transparent display 46, annotations 130 for the live image 128 within the first and second images 12A, 12B.

In one exemplary embodiment, the annotations 130 displayed within the first private information and within the second private information are the same. In another exemplary embodiment, the annotations 130 displayed within the first private information are based on preferences of the first passenger 14A and the annotations 130 displayed within the second private information are based on preferences of the second passenger 14B.

In an exemplary embodiment, the method 200 further includes, moving to block 234, receiving, with the system controller 19, input from the first passenger 14A to modify the first image 12A, moving to block 236, modifying, with the system controller 19, the first image 12A based on the input received from the first passenger 14A, and, moving to block 238, modifying, with the system controller 19, the second image 12B based on the input from the first passenger 14A.

In another exemplary embodiment, the including social media information within the first image 12A at block 202 and the including social media information within the second image 12B at block 208 further includes, moving to block 240, collecting, with the system controller 19, data related to the first passenger 14A and data related to the second passenger 14B, moving to block 242, identifying, based on the data related to the first passenger 14A and data related to the second passenger 14B, common interests of the first and second passengers 14A, 14B, moving to block 244, selecting social media applications that include elements related to the identified common interests of the first and second passengers 14A, 14B, and finally, moving block 202, including real-time social media information from the selected social media applications within the first image 12A, and, moving to block 208, including real-time social media information from the selected social media applications within the second image 12B.

In another exemplary embodiment, the system controller 19 is adapted to support social media applications that allow the first and second passengers 14A, 14B to communicate with a remotely located person, wherein, the including real-time social media information within the first image 12A, at block 202, and within the second image 12B, at block 208, further includes, including, within the first image 12A and the second image 12B, a three-dimensional graphical representation 132 of the remotely located person. Further, the collecting, with the system controller 19, via the first microphone 116, audio input from the first passenger 14A at block 226 further includes receiving, via the first microphone 116, audible communications from the first passenger 14A, and the collecting, with the system controller 19, via the second microphone 118, audio input from the second passenger 14B at block 228 further includes receiving, via the second microphone, audible communications from the second passenger 14B. The broadcasting, with the system controller 19, via the first zonal speaker 120, audio output for the first passenger 14A at block 230, and the broadcasting, with the system controller 19, via the second zonal speaker 122, audio output for the second passenger 14B at block 232, further includes broadcasting, via the first and second zonal speakers 120, 122, audible communications from the remotely located person.

In another exemplary embodiment, the method 200 further includes, moving to block 246, modifying the three-dimensional graphical representation 132 of the remotely located person within the first and second image 12A, 12B, such that the three-dimensional graphical representation 132 of the remotely located person faces the first passenger 14A when the system controller 19 detects audible communication from the first passenger 14A, and, moving to block 248, modifying the three-dimensional graphical representation 132 of the remotely located person within the first and second image 12A, 12B, such that the three-dimensional graphical representation 132 of the remotely located person faces the second passenger 14B when the system controller 19 detects audible communication from the second passenger 14B.

In another exemplary embodiment, the method 200 further includes, moving to block 250, modifying the three-dimensional graphical representation 132 of the remotely located person within the first and second images 12A, 12B, such that the three-dimensional graphical representation 132 of the remotely located person faces the first passenger 14A when the system controller 19 determines that audible communication from the remotely located person is directed to the first passenger 14A, and, moving to block 252, modifying the three-dimensional graphical representation 132 of the remotely located person within the first and second images 12A, 12B, such that the three-dimensional graphical representation 132 of the remotely located person faces the second passenger 14B when the system controller 19 determines that audible communication from the remotely located person is directed to the second passenger 14B.

In another exemplary embodiment, the method 200 further includes, moving to block 254, incorporating facial expressions and body language into the three-dimensional graphical representation 132 of the remotely located person based on audible communication from the remotely located person.

In still another exemplary embodiment, after receiving, with the system controller 19, via the at least one first sensor 74, input comprising a position of a head and eyes of the first passenger 14A, at block 222, and receiving, with the system controller 19, via the at least one first gesture sensor 110, information related to gestures made by the first passenger 14A, and receiving, with the system controller 19, via the transparent display 46, input from the first passenger 14A, the method 200 further includes, moving to block 256, navigating selectable options presented within the first image 12A based on input from the first passenger 14A collected by the transparent display 46, the at least one first sensor 74 and the at least one gesture sensor 110.

A system of the present disclosure offers several advantages. These include providing a floating image including real-time social media information that is perceived by the passengers at a centrally location position within the vehicle compartment. This provides a camp-fire like viewing atmosphere where the passengers can all view a common floating image, or each passenger can view a unique floating image. Further, a system in accordance with the present disclosure provides the ability to display annotations and information not embedded within the virtual image and to ensure such annotations and information are perceived by a passenger at a proper location relative to the virtual image and in a plane between the passenger and the floating image. The system also allows a passenger to interact with the virtual image via the touch screen passenger interface and uses parallax compensation to ensure the system correctly correlates passenger input via the passenger interface to annotations and information displayed along with the virtual image.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of using a system for generating a centrally located floating three-dimensional image display for a plurality of passengers positioned within a vehicle compartment, comprising:

displaying, with a first display of an image chamber in communication with a system controller, a first image including real-time social media information;

receiving, with a first reflector individually associated with a first passenger, the first image from the first display;

reflecting, with the first reflector, the first image to the first passenger, wherein the first passenger perceives the first image floating at a central location within the image chamber;

displaying, with a second display of the image chamber in communication with a system controller, a second image including real-time social media information;

receiving, with a second reflector individually associated with a second passenger, the second image from the second display;

reflecting, with the second reflector, the second image to the second passenger, wherein the second passenger perceives the second image floating at the central location within the image chamber;

displaying, with a transparent display in communication with the system controller and positioned between eyes of the first passenger and the first reflector and between the eyes of the second passenger and the second reflector, first private information to the first passenger within an image plane positioned in front of the first image floating at the central location within the image chamber and second private information to the second passenger within an image plane positioned in front of the second image floating at the central location within the image chamber;

receiving, with the system controller, input from the first passenger and the second passenger; and collecting, with an external scene camera, images of an external environment outside the vehicle compartment.

2. The method of claim 1, wherein, the receiving, with the system controller, input from the first passenger and the second passenger, further includes:

receiving, with the system controller, via the transparent display, input from the first passenger and the second passenger;

receiving, with the system controller, via at least one first sensor, input comprising a position of a head and eyes of the first passenger;

receiving, with the system controller, via at least one first gesture sensor, information related to gestures made by the first passenger;

collecting, with the system controller, via a first microphone, audio input from the first passenger; and collecting, with the system controller, via a second microphone, audio input from the second passenger; and the method further including:

broadcasting, with the system controller, via a first zonal speaker, audio output for the first passenger; and broadcasting, with the system controller, via a second zonal speaker, audio output for the second passenger.

3. The method of claim 2, wherein the including real-time social media information within the first image and within the second image further includes, including within the first image and within the second image, live images from locations remote from the vehicle, and the displaying, with the transparent display, first private information and second private information further includes, including within the first and second private information displayed on the transparent display, annotations for the live image within the first and second images.

4. The method of claim 3, wherein the annotations displayed within the first private information and within the second private information are the same.

5. The method of claim 3, wherein the annotations displayed within the first private information are based on preferences of the first passenger and the annotations displayed within the second private information are based on preferences of the second passenger.

6. The method of claim 3, further including:

receiving, with the system controller, input from the first passenger to modify the first image;

modifying, with the system controller, the first image based on the input received from the first passenger; and modifying, with the system controller, the second image based on the input from the first passenger.

7. The method of claim 2, wherein the including real-time social media information within the first image and within the second image further includes:

collecting, with the system controller, data related to the first passenger and data related to the second passenger;

identifying, based on the data related to the first passenger and the data related to the second passenger, common interests of the first and second passengers; and selecting social media applications that include elements related to the identified common interests of the first and second passengers; and including real-time social media information from the selected social media applications within the first image and within the second image.

8. The method of claim 2, wherein the system controller is adapted to support social media applications that allow the first and second passengers to communicate with a remotely located person, wherein:

the including real-time social media information within the first image and within the second image further includes including, within the first image and the second image, a three-dimensional graphical representation of the remotely located person;

the collecting, with the system controller, via the first microphone, audio input from the first passenger further includes receiving, via the first microphone, audible communications from the first passenger;

the collecting, with the system controller, via the second microphone, audio input from the second passenger further includes receiving, via the second microphone, audible communications from the second passenger; and the broadcasting, with the system controller, via the first zonal speaker, audio output for the first passenger, and the broadcasting, with the system controller, via the second zonal speaker, audio output for the second passenger further includes broadcasting, via the first and second zonal speakers, audible communications from the remotely located person.

9. The method of claim 8, further including:

modifying the three-dimensional graphical representation of the remotely located person within the first and second image, such that the three-dimensional graphical representation of the remotely located person faces the first passenger when the system controller detects audible communication from the first passenger; and modifying the three-dimensional graphical representation of the remotely located person within the first and second image, such that the three-dimensional graphical representation of the remotely located person faces the second passenger when the system controller detects audible communication from the second passenger.

10. The method of claim 8, further including:

modifying the three-dimensional graphical representation of the remotely located person within the first and second image, such that the three-dimensional graphical representation of the remotely located person faces the first passenger when the system controller determines that audible communication from the remotely located person is directed to the first passenger; and modifying the three-dimensional graphical representation of the remotely located person within the first and second image, such that the three-dimensional graphical representation of the remotely located person faces the second passenger when the system controller determines that audible communication from the remotely located person is directed to the second passenger.

11. The method of claim 8, further including incorporating facial expressions and body language into the three-dimensional graphical representation of the remotely located person based on audible communication from the remotely located person.

12. The method of claim 2, further including:
receiving, with the system controller, via the at least one first sensor, input comprising a position of a head and eyes of the first passenger;
receiving, with the system controller, via the at least one first gesture sensor, information related to gestures made by the first passenger; and
receiving, with the system controller, via the transparent display, input from the first passenger; and
navigating selectable options presented within the first image based on input from the first passenger collected by the transparent display, the at least one first sensor and the at least one gesture sensor.

13. A system for generating a centrally located floating three-dimensional image display for a plurality of passengers positioned within a vehicle compartment within a vehicle, comprising:
a system controller adapted to collect data related to a first passenger and data related to a second passenger, identify, based on the data related to the first passenger and the data related to the second passenger, common interests of the first and second passengers, and select social media applications that include elements related to the identified common interests of the first and second passengers;
an image chamber including:
a first display adapted to project a first image including real-time social media information and live images from locations remote from the vehicle from the selected social media applications;
a first reflector individually associated with the first display and a first one of the plurality of passengers, the first reflector adapted to receive the first image from the first display and to reflect the first image to the first passenger, wherein the first passenger perceives the first image floating at a central location within the image chamber;
a second display adapted to project a second image including real-time social media information and live images from locations remote from the vehicle from the selected social media applications; and
a second reflector individually associated with the second display and a second one of the plurality of passengers, the second reflector adapted to receive the second image from the second display and to reflect the second image to the second passenger, wherein, the second passenger perceives the second image floating at the central location within the image chamber; and
a transparent touch screen display positioned between the first reflector and the first passenger and between the second reflector and the second passenger and adapted to display first private information, including annotations for the live image within the first image based on preferences of the first passenger, to the first passenger within an image plane positioned in front of the first image floating at the central location within the image chamber and to receive input from the first passenger, and adapted to display second private information, including annotations for the live image within the second image based on preferences of the second passenger, to the second passenger within an image plane positioned in front of the second image floating at the central location within the image chamber and to receive input from the second passenger; and
an external scene camera adapted to collect images of an external environment outside the vehicle compartment;
wherein, the system controller is adapted to:
receive, with the system controller, via the transparent display, input from the first passenger and the second passenger;
receive, with the system controller, via at least one first sensor, input comprising a position of a head and eyes of the first passenger;
receive, with the system controller, via at least one first gesture sensor, information related to gestures made by the first passenger;
collect, with the system controller, via a first microphone, audio input from the first passenger;
collect, with the system controller, via a second microphone, audio input from the second passenger;
broadcast, with the system controller, via a first zonal speaker, audio output for the first passenger; and
broadcast, with the system controller, via a second zonal speaker, audio output for the second passenger.

14. The system of claim 13, wherein the system controller is further adapted to:
receive input from the first passenger to modify the first image;
modify the first image based on the input received from the first passenger; and
modify the second image based on the input from the first passenger.

15. The system of claim 14, wherein the system controller is further adapted to:
support social media applications that allow the first and second passengers to communicate with a remotely located person;
receive, via the first and second microphones, audible communications from the first and second passengers; and
broadcast, via the first and second zonal speakers, audible communications from the remotely located person.

16. The system of claim 15, wherein the system controller is further adapted to:
include, within the first image and the second image, a graphical representation of the remotely located person;
modify the three-dimensional graphical representation of the remotely located person within the first and second image, such that the three-dimensional graphical representation of the remotely located person faces the first passenger when the system controller detects audible communication from the first passenger, and faces the second passenger when the system controller detects audible communication from the second passenger;
modify the three-dimensional graphical representation of the remotely located person within the first and second image, such that the three-dimensional graphical representation of the remotely located person faces the first passenger when the system controller determines that audible communication from the remotely located person is directed to the first passenger, and faces the second passenger when the system controller determines that audible communication from the remotely located person is directed to the second passenger; and incorporate facial expressions and body language into the three-dimensional graphical representation of the remotely located person based on audible communication from the remotely located person.

17. The system of claim 16, wherein the system controller is further adapted to:
receive, via the at least one first sensor, input comprising a position of a head and eyes of the first passenger;
receive, via the at least one first gesture sensor, information related to gestures made by the first passenger;
receive, via the transparent display, input from the first passenger; and
navigate selectable options presented within the first image based on input from the first passenger collected by the transparent display, the at least one first sensor and the at least one first gesture sensor.

18. A method of using a system for generating a centrally located floating three-dimensional image display for a plurality of passengers positioned within a vehicle compartment, comprising:
collecting, with a system controller, data related to the first passenger and data related to the second passenger, identifying, based on the data related to the first passenger and the data related to the second passenger, common interests of the first and second passengers, and selecting social media applications that include elements related to the identified common interests of the first and second passengers;
displaying, with a first display of an image chamber in communication with a system controller, a first image including real-time social media information from the selected social media applications, receiving, with a first reflector individually associated with a first passenger, the first image from the first display, and reflecting, with the first reflector, the first image to the first passenger, wherein the first passenger perceives the first image floating at a central location within the image chamber;
displaying, with a second display of the image chamber in communication with a system controller, a second image including real-time social media information from the selected social media applications, receiving, with a second reflector individually associated with a second passenger, the second image from the second display, and reflecting, with the second reflector, the second image to the second passenger, wherein the second passenger perceives the second image floating at the central location within the image chamber;
displaying, with a transparent display in communication with the system controller and positioned between eyes of the first passenger and the first reflector and between the eyes of the second passenger and the second reflector, first private information to the first passenger within an image plane positioned in front of the first image floating at the central location within the image chamber and second private information to the second passenger within an image plane positioned in front of the second image floating at the central location within the image chamber;
receiving, with the system controller, via the transparent display, input from the first passenger and the second passenger;
receiving, with the system controller, via at least one first sensor, input comprising a position of a head and eyes of the first passenger;
receiving, with the system controller, via at least one first gesture sensor, information related to gestures made by the first passenger;
collecting, with the system controller, via a first microphone, audio input from the first passenger;
collecting, with the system controller, via a second microphone, audio input from the second passenger;
broadcasting, with the system controller, via a first zonal speaker, audio output for the first passenger;
broadcasting, with the system controller, via a second zonal speaker, audio output for the second passenger;
collecting, with an external scene camera, images of an external environment outside the vehicle compartment; and
receiving, with the system controller, input from the first passenger to modify the first image, modifying, with the system controller, the first image based on the input received from the first passenger, and modifying, with the system controller, the second image based on the input from the first passenger.

19. The method of claim 18, wherein the system controller is adapted to support social media applications that allow the first and second passengers to communicate with a remotely located person, wherein, the including real-time social media information within the first image and within the second image further includes including, within the first image and the second image, a three-dimensional graphical representation of the remotely located person, the method further including:
receiving, via the first and second microphones, audible communications from the first and second passengers;
broadcasting, via the first and second zonal speakers, audible communications from the remotely located person;
modifying the three-dimensional graphical representation of the remotely located person within the first and second image, such that the three-dimensional graphical representation of the remotely located person faces the first passenger when the system controller detects audible communication from the first passenger and faces the second passenger when the system controller detects audible communication from the second passenger;
modifying the three-dimensional graphical representation of the remotely located person within the first and second image, such that the three-dimensional graphical representation of the remotely located person faces the first passenger when the system controller determines that audible communication from the remotely located person is directed to the first passenger, and faces the second passenger when the system controller determines that audible communication from the remotely located person is directed to the second passenger; and
incorporating facial expressions and body language into the three-dimensional graphical representation of the remotely located person based on audible communication from the remotely located person.

20. The method of claim 19, further including:
receiving, with the system controller, via the at least one first sensor, input comprising a position of a head and eyes of the first passenger;
receiving, with the system controller, via the at least one first gesture sensor, information related to gestures made by the first passenger; and
receiving, with the system controller, via the transparent display, input from the first passenger; and navigating selectable options presented within the first image based on input from the first passenger collected by the transparent display, the at least one first sensor and the at least one gesture sensor.

* * * * *